United States Patent Office 2,709,704
Patented May 31, 1955

---

2,709,704

CARBINOL PRODUCTION

Herbert C. Brown, West Lafayette, Ind.

No Drawing. Application April 7, 1954,
Serial No. 421,675

9 Claims. (Cl. 260—347.8)

This invention relates to a process for the production of carbinols by the decomposition of certain organo-boron compounds with methanol and especially to the decomposition with methanol of organo-boron compounds, produced by the reaction of diborane with carbonyl compounds, to produce methyl borate and a carbinol, and the subsequent separation of the methyl borate from the thus-produced carbinol.

It is known in the art to produce carbinols by the hydrolysis with water of certain organo-boron compounds to produce a carbinol and boric acid [H. C. Brown et al., J. Am. Chem. Soc., 61, 673 (1939)]. However, the removal of the contaminating boric acid from the mixture requires extraction with base, and/or treatment with acid, or the like. If base is used to remove the boric acid, base-sensitive carbinol compounds cannot be conveniently prepared in this reaction. Similarly, if an acid wash is necessary, acid-sensitive compounds cannot be readily produced in good yield by this reaction. Further, since water is used in the decomposition of the organo-boron compound and in the extraction of the boric acid, organic carbonyl compounds or the carbinols produced therefrom which are hydroscopic, water-sensitive, or water-soluble cannot usually be used satisfactorily in the reaction. Furthermore, the last traces of boric acid are sometimes difficult to remove from the mixture.

It is an object of the present invention to provide a process for the production of carbinols from certain organo-boron compounds without exposure to the action of added acids, bases or water. Another object is the provision of a process for the conversion of certain carbonyl compounds to carbinols through intermediately formed organo-boron compounds. Other objects will be apparent to those skilled in the art to which this invention pertains.

According to the method of the present invention, an organo-boron compound, such as is produced by the reaction of diborane with an organic carbonyl compound according to procedure known in the art, and which may be represented by the following formula:

$$(R\text{---}O\text{---})_n\text{---}B\text{---}H_{3-n} \qquad (I)$$

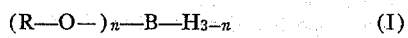

wherein $n$ is 1, 2, or 3 and wherein R—O— contains at least two carbon atoms and represents a carbinol moiety the hydroxy hydrogen of which has been replaced by the borine radical, is decomposed with methanol into an organic hydroxy compound (carbinol) containing at least two carbon atoms and methyl borate, the methyl borate being separated from the carbinol, preferably by volatilization, e. g., distillation at atmospheric pressure.

Since methyl borate is very volatile, with a boiling point of 68 degrees centigrade, the carbinol produced in the reaction is readily isolated from the methyl borate and the excess methanol, if any, by volatilization of the latter compounds. If excess methanol is employed, the methyl borate and the excess methanol will distill as an azeotrope consisting of 75.5 percent by weight methyl borate and boiling at 54.6 degrees at atmospheric pressure. If the carbinol produced in the reaction is relatively volatile, fractional distillation of the reaction products through a column may be necessary. Usually, however, evaporation of the methyl borate and methanol by a stream of air or by heating the mixture on a steam bath will readily remove the methyl borate and methanol and leave the carbinol as the distillation residue.

Apparently the methanol, when mixed with an organo-borine represented by Formula I, reacts first to replace the hydrogens, if any, attached to the boron atom with methoxy radicals, a mole of methanol being required per hydrogen attached to the boron atom of a mole of organo-boron compound, to produce hydrogen and a compound represented by the following formula:

$$(R\text{---}O\text{---})_n\text{---}B\text{---}(\text{---}O\text{---}CH_3)_{3-n} \qquad (II)$$

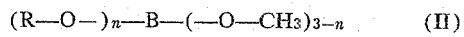

wherein $n$ and R—O— have the values given above, i. e., a mixed ester of boric acid. Additional methanol added to the mixture followed by the separation of the thus-produced methyl borate causes complete replacement of the R—O— radicals of Formula II by $CH_3$—O— radicals with the concomitant formation of a carbinol. The methyl borate may then be separated by any convenient method, preferably by volatilization. While the decomposition of an organo-boron compound with water produces boric acid which is difficult in many instances to remove completely from the mixture, the decomposition of an organo-boron compound with methanol according to the process of the present invention produces the volatile methyl borate or methyl borate-methanol azeotrope which is readily removed from the reaction mixture.

The theoretical amount of methanol required to completely convert a mole of organo-boron compound represented by Formula I to methyl borate and a carbinol thus appears to be three moles per mole of organo-boron compound, whether the methanol replaces the hydrogens attached to the boron atom or replaces the R—O— radicals. The addition of at least an additional amount of methanol sufficient to produce the more volatile methyl borate-methanol azeotrope is desirable, however. If hydrogen atoms are attached to the boron atom in the starting organo-boron compound, i. e., when $n$ is one or two, hydrogen is produced as a product of the reaction whereas when $n$ is three, methyl borate and the carbinol are the sole products of the reaction. Although the theoretical amount of methanol necessary to convert a mole of organo-boron compound represented by Formula I to methyl borate and a carbinol is three moles, it is usually preferred to use a large molar excess of methanol since the speed and completeness of the reaction appear to be enhanced thereby.

While the decomposition of the organo-boron compounds described above with methanol is conveniently carried out at room temperature, temperatures substantially above and below room temperature may be employed, e. g., from about zero degrees centigrade or lower to the boiling point of the reaction mixture. Decomposing the organo-boron compound with methanol at the boiling point of the reaction mixture without return of the distillate removes the methyl borate as it is formed and thus, in some instances, is a preferred embodiment of the invention.

A convenient method of producing a carbinol according to the method of the present invention consists of adding methanol, at room temperature, to a reaction mixture containing an organo-boron compound represented by Formula I in a solvent such as, for example, ether, dioxane, tetrahydrofurane, benzene, methylene chloride, chloroform, or the like, or in the absence of a solvent, until any evolution of hydrogen ceases and greater than about three molar equivalents of methanol has been added to the mixture. The reaction mixture is then heated until the methyl borate distills therefrom. Isolation of the thus-produced carbinol is conveniently achieved by continuing the distillation until the excess methanol and the reaction solvent, if any, is also distilled from the mixture, leaving the carbinol as the distillation residue, which can be further purified, if desired, by distillation, crystallization, chromatography, or any other convenient means.

The present invention, i. e., a process for the production of carbinols from certain organo-boron compounds, is of parctical importance, rendering the process for the production of carbinols from organo-boron compounds more versatile, and more readily adaptable to large scale operation due to the ease of removal of any boron in the reaction mixture. For example, if the reaction product is to be crystallized from a solvent boiling above about 65 degrees centigrade and which is substantially inert to diborane, the starting carbonyl compound may be dissolved in the amount of the selected solvent which would be suitable for the crystallization of the reaction product and the theoretical amount of diborane usually plus a slight excess added to the solution, thereby producing organo-boron compound. The organo-boron compound is then decomposed by the addition of methanol. The preferred amount is four moles of methanol per mole of boron compound in the reaction mixture. The methanol and methyl borate can then be distilled leaving only the reaction product and the crystallization solvent. Since diborane readily produces compounds of Formula I by its reaction with certain carbonyl compounds and can now be conveniently prepared commercially and in the laboratory, e. g., Schapiro, et al., J. Am. Chem. Soc. 74, 901 (1952); Elliott, et al., J. Am. Chem. Soc. 74, 5047 (1952), the present invention is of particular importance in connection with the production of the organo-boron compounds of Formula I by reaction of diborane and an organic carbonyl compound.

The following examples are illustrative of the process of the present invention and compounds produced therein, but are not to be construed as limiting.

*Example 1.—Cyclohexanol*

In a vacuum trap type flask of about fifty-milliliter capacity, having an inlet tube reaching to the bottom and an outlet at the top, is placed 19.6 grams (0.2 mole) of freshly distilled cyclohexanone. While maintaining the contents at about room temperature, there is introduced into the flask the gaseous diborane (a chemical equivalent excess) produced by the reaction, in a sealed flask connected by a tube from the top of its condenser to the inlet of the cyclohexanone-containing flask, of 10.2 grams (0.15 mole) of boron trifluoride (as the etherate) in ether added to a solution of 3.8 grams (0.1 mole) of lithium aluminum hydride in sixty milliliters of anhydrous ether. Adding twenty milliliters of methanol to the thus-produced dicyclohexyloxyborine and then heating on a steam bath distills methyl borate and methonal from the flask, leaving a residue of essentially pure cyclohexanol boiling at 160 to 161 degrees centigrade.

*Example 2.—Octanol-2*

In the same manner as described in Example 1, reacting methyl n-hexyl ketone with an excess of diborane is productive of dioctyloxy-2-borine which is decomposed by methyl alcohol into octanol-2, boiling at 179 to 180 degrees centigrade and methyl borate boiling at 63 degrees centigrade. The methyl borate and excess methanol are easily removed by heating on a steam bath leaving essentially pure octanol-2 as the residue.

*Example 3.—Δ⁵-pregnene-3β,20-diol*

In the same manner as described in Example 1, the reaction of a chemical equivalent excess of diborane with pregnenolone (Δ⁵ - pregnene-3-ol-20-one) in methylene chloride, followed by the addition of a large excess of methanol and thereafter distilling the whole to dryness, leaves a residue of Δ⁵-pregnene-3β,20-diol [compare H. Hirchmann and F. B. Hirschmann, J. Biol. Chem. 157, 601 (1945)].

*Example 4.—Diphenylcarbinol*

Bubbling a chemical equivalent-excess of diborane into a solution of benzophenone in anhydrous ether followed by the addition thereto of a large molar excess of methanol is productive of diphenylcarbinol. Evaporation of the methanol, ether, and the thus-produced methyl borate in a stream of air leaves diphenylcarbinol as the residue; melting point, 68 to 69 degres centigrade.

*Example 5.—Benzyl alcohol*

Bubbling 3.5 grams of diborane into a solution of fifty grams of freshly distilled benzaldehyde dissolved in 500 milliliters of anhydrous ether followed by the addition of fifty milliliters of methanol to the mixture and then fractionally distilling the mixture of reaction products yields methyl borate, methanol, and benzyl alcohol.

*Example 6.—Furfuryl alcohol*

Adding diborane to a large excess of furfural-2 produces trifurfuryloxy-2-borine which is decomposed with methanol into methyl borate and furfuryl alcohol, all dissolved in the excess furfural. Heating the mixture on a steam bath distills the methanol and methyl borate and leaves a mixture of furfural-2 and furfuryl alcohol (α-furylcarbinol) which can be separated by fractional distillation.

*Example 7.—Tertiary butyl carbinol*

The reaction of about seven grams of diborane with seventy grams of trimethylacetaldehyde in 500 milliliters of chloroform followed by the addition thereto of fifty milliliters of methanol and then distilling the chloroform, methyl borate, and methyl alcohol from the mixture leaves a residue of tertiary butyl carbinol, melting point, 52 to 53 degrees centigrade.

*Example 8.—Pregnane-3,11,20-triol*

Into a solution of 3.3 grams (0.01 mole) of pregnane-3,11,20-trione in 250 milliliters of methylene chloride was introduced diborane in excess of the theoretical .0075 mole necessary to convert the three keto groups of pregnane-3,11,20-trione to carbonoxy-boron linkages. To the resulting mixture was added ten milliliters of dry methanol and the whole was then distilled to dryness, leaving a solid residue of pregnane-3,11,20-triol.

It is to be understood that the invention is not to be limited to the exact details of operation or exact compounds shown and described as obvious modifications and equivalents will be apparent to one skilled in the art and the invention is therefore to be limited only by the scope of the appended claims.

I claim:

1. A process for the production of a carbinol from an organo-boron compound which comprises: mixing an organo-borine represented by the following formula:

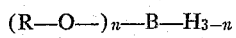

$$(R-O-)_n-B-H_{3-n}$$

wherein $n$ is a positive whole integer from one to three, inclusive, and wherein R—O— contains at least two carbon atoms and represents a carbinol moiety the hydroxy hydrogen of which has been replaced by the borine radical, with methanol to produce methyl borate and a carbinol containing at least two carbon atoms, and thereafter separating the methyl borate from the thus-produced carbinol.

2. The process of claim 1 wherein the methyl borate is separated by volatilization.

3. The process of claim 1 wherein greater than about three molar equivalents of methanol is mixed with the organo-borine and the methyl borate and excess methanol are then separated from the carbinol.

4. A process for the production of a carbinol from an organo-boron compound which comprises: mixing an organo-borine represented by the following formula:

$$(R\text{—}O\text{—})_n\text{—}B\text{—}H_{3-n}$$

wherein $n$ is a positive whole integer from one to three, inclusive, and wherein R—O— contains at least two carbon atoms and represents a carbinol moiety the hydroxy hydrogen of which has been replaced by the borine radical, with greater than about three molar equivalents of methanol to produce methyl borate and a carbinol containing at least two carbon atoms, and then separating the methyl borate from the thus-produced carbinol by volatilization of the methyl borate.

5. The process of claim 4 wherein the methyl borate is volatilized by distillation at about atmospheric pressure.

6. The process of claim 4 wherein the excess methanol as well as the methyl borate is volatilized.

7. A process for the production of a carbinol which comprises: contacting an organic carbonyl compound with diborane to produce an organo-borine represented by the following formula:

$$(R\text{—}O\text{—})_n\text{—}B\text{—}H_{3-n}$$

wherein $n$ is a positive whole integer from one to three, inclusive, and wherein R—O— contains at least two carbon atoms and represents a carbinol moiety the hydroxy hydrogen of which has been replaced by the borine radical, reacting the thus-produced organo-borine with methanol to produce methyl borate and a carbinol containing at least two carbon atoms, and then separating the methyl borate from the thus-produced carbinol.

8. A process for the production of a carbinol which comprises: contacting an organic carbonyl compound with diborane to produce an organo-borine represented by the following formula:

$$(R\text{—}O\text{—})_n\text{—}B\text{—}H_{3-n}$$

wherein $n$ is a positive whole integer from one to three, inclusive, and wherein R—O— contains at least two carbon atoms and represents a carbinol moiety the hydroxy hydrogen of which has been replaced by the borine radical, reacting the thus-produced organo-borine with greater than about three molar equivalents of methanol to produce methyl borate and a carbinol containing at least two carbon atoms and then separating the methyl borate from the thus-produced carbinol by volatilization of the methyl borate.

9. The process of claim 8 wherein excess methanol and methyl borate are separated by distillation at about atmospheric pressure.

References Cited in the file of this patent

UNITED STATES PATENTS

| | | |
|---|---|---|
| 1,668,797 | Bannister | May 8, 1928 |
| 2,077,967 | Stanley | Apr. 20, 1937 |
| 2,542,746 | Banus | Feb. 20, 1951 |
| 2,623,886 | Biel | Dec. 30, 1952 |
| 2,628,966 | Graber | Feb. 17, 1953 |

OTHER REFERENCES

Chaikin, Jour. Am. Chem. Soc., 71, 122–125 (1949).